United States Patent [19]

Olsen et al.

[11] Patent Number: 4,497,735
[45] Date of Patent: Feb. 5, 1985

[54] ARYLIDE AZOPIGMENTS FORMED BY COUPLING A DIAZORYL COMPOUND WITH AN OMEGA-AMMONIUMACETOACTIC ACID DERIVATIVE

[75] Inventors: Steffen C. Olsen, Farum; Arne Vinther, Køge, both of Denmark

[73] Assignee: Kemisk Vaerk Koge A/S, Køge, Denmark

[21] Appl. No.: 425,829

[22] Filed: Sep. 28, 1982

[30] Foreign Application Priority Data

Oct. 5, 1981 [GB] United Kingdom ............... 8129997

[51] Int. Cl.$^3$ ............... C09B 29/01; C09B 29/33; C09B 35/10; D06P 1/44
[52] U.S. Cl. .................... 534/603; 106/23; 106/288 Q; 106/300; 106/308 Q; 106/309; 560/170; 562/567; 564/194; 534/614
[58] Field of Search ............ 260/193, 176, 501.15; 564/200

[56] References Cited

U.S. PATENT DOCUMENTS 2,261,626  11/1941  Lang .............................. 260/193 X
3,524,842  8/1970  Grossmann et al. ........... 260/193 X

*Primary Examiner*—Floyd D. Higel
*Attorney, Agent, or Firm*—Lawrence Rosen

[57] ABSTRACT

Azopigments resulting from coupling a diazoaryl compound with an acetoacetic acid derivative having a quaternary ammonium group linked to the terminal methyl group show increased color strength and improved stability on storing as compared with the corresponding azopigments not having the said quaternary ammonium group in the molecule. For example, 2-nitro-4-chloro phenyldiazonium chloride or dichlorobenzidinetertrazonium chloride is coupled with an omega-ammoniumacetic acid derivative. The arylide azopigments of the present invention can be used in printing inks.

2 Claims, No Drawings

ARYLIDE AZOPIGMENTS FORMED BY COUPLING A DIAZORYL COMPOUND WITH AN OMEGA-AMMONIUMACETOACTIC ACID DERIVATIVE

This invention relates to azopigments of the arylide type. Owing to the great colour strength, arylide pigments are extensively used in printing ink manufacture.

Since the colour strength is dependent upon the crystal size of the pigments, being greater with the crystals being smaller, it is of interest to make the crystals as small as possible. However, a reduction in size of the crystals gives a corresponding increase of the viscosity of printing inks, in which the pigments are used, and this puts a limit on how small the crystals can be for practical use.

The said limit can be lowered by means of various auxilliaries, whereby a better utilization of the colour strength of the pigments can be obtained. Thus, various resin types can be used as additions to pigments for offset printing inks, whereas pigments to be used in magazine rotogravure printing can be improved by means of aliphatic amines. It is further known that an addition of arylide pigments carrying sulfonic acid groups gives better-flowing printing inks than do pigments without such groups.

A disadvantage in the use of the said auxilliaries is that on storing the printing inks, conversions take place whereby the colour strength is reduced, and the viscosity is increased. The corrections thus necessitated for the practical use of the printing inks are of serious disadvantage, making it difficult to obtain a satisfying quality of printing.

The object of the invention is to provide azopigments relieving the said disadvantage, and the experiments on which the invention is based have shown that by introducing quaternaty ammonium groups in omega positions, azopigments can be obtained, having increased colour strength and improved flow properties, both properties being retained on storing of the printing inks so that corrections before use can be avoided.

Thus, an azopigment according to the invention is characterized in that it consists of or in mixture with other azopigments contains the coupling product of a diazoaryl compound with an acetoacetic acid derivative of the formula

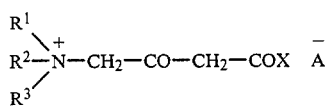

wherein $R^1$, $R^2$ and $R^3$ are the same or different, each representing an alkyl group of maximum 20 carbon atoms, X represents an anilide group or substituted anilide group, or an $OR^4$ group, in which $R^4$ is hydrogen, a metal atom, or an alkyl group of maximum 6 carbon atoms, and A is an anion.

Preferably, two of $R^1$, $R^2$ and $R^3$ are lower alkyl, such as methyl, the third either being likewise a lower alkyl group, such as methyl, or a long-chain alkyl group, such as a stearyl or oleyl group.

Substituents on the anilide group are preferably selected from halogens and alkyl groups, for example chlorine and methyl.

Examples of $R^4$ being other than hydrogen are potassium and calcium, methyl and ethyl.

The anion A is generally a chloride ion, but could also be for example a sulfate or an acetate ion.

The diazoaryl compound used in the coupling product can be any of the known aromatic diazocompounds, as for example 2-nitro-4-chlorophenyldiazonium chloride or dichlorobenzidinetetrazonium chloride. As coupling partner can be used an omega-ammoniumacetoacetic acid derivative as such or in mixture with an acetoacetic acid derivative without the omega-ammonium group.

Omega-ammoniumacetoacetanilides can be produced for example by reacting an omega-chloroacetoacetanilide with a tertiary amine, as for example trimethylamine, dimethylstearylamine or dimethylcocosamine. In corresponding manner by varying between the tertiary amines and the anions of the omega-ammoniumacetoacetic acid derivatives and by varying the diazoaryl compounds, azopigments can be obtained having properties suited to the intended use. Thus, some of the possible combinations improve the properties of pigments for use in aqueous systems, whereas others are particularly suited for use in ester systems and others again have improved properties for use in lowpolar systems.

The following Examples A to F illustrate the production of omega-ammoniumacetoacetic acid derivatives which are suited for use as coupling partners in the production of the azopigments of the invention.

EXAMPLE A 105.8 g of 4-chloroacetoacetanilide are added in portions while stirring at 20° C. to a 40% aqueous solution of 148 g of trimethylamine. The stirring is continued for 3½ hours, after which the solution is filtered and the filtrate is evaporated to dryness. The residue is suspended in ether, filtered, and dried.

EXAMPLE B 70.2 g of dimethylcocosamine are dissolved in 150 ml of 99% ethanol and 63.5 g of 4-chloroacetoacetanilide are added in portions during 2 hours while stirring at 20° C. The resulting solution is stirred for 2 days, after which it is filtered and the filtrate is evaporated.

EXAMPLE C 89.9 g of dimethylstearylamine are dissolved in 150 ml of ethanol and 63.5 g of 4-chloroacetoacetanilide are added in portions during 2 hours with stirring at 20° C. Stirring at 20° C. is continued for further 3 hours, after which the reaction mixture is filtered, and the filtrate is evaporated.

EXAMPLES D, E, AND F

The procedures of Examples A, B, and C were repeated, using 73.9 g of 4-chloroacetoacet-2-chloroanilide instead of 63.5 g of 4-chloroacetoacetanilide.

The following Examples G, H, J, and K relate to the production of azopigments outside the scope of the invention, but serving for comparison purposes, the azopigments of the invention being produced in a corresponding manner.

EXAMPLE G

A. 52,4 g of 3,3'-dichlorobenzidine-bishydrochloride are suspended in 80 ml of water and 73.5 ml of 30% hydrochloric acid at 0° C. with stirring for 2 hours.

While keeping the temperature at 0° C., 400 ml of water and 22.5 g of sodium nitrite are added, stirring being continued for ½ hour. The surplus of nitrous acid is removed with sulfamic acid, and water is added to a volume of 700 ml, the solution being filtered twice.

B. The filtrate of Step A is added at 20° C. during 2 hours to a suspension of 58 g of acetoacetanilide in a mixture of 1200 ml of water, 8.4 g of acetic acid and 1.8 g of tallow-1,3-propanediamine at pH 4.2. After the coupling, the reaction mixture is heated to 90° C. and stirred for 2 hours at this temperature. Then, 7.0 g of oleylamine and 13.2 g of tallow-1,3-propanediamine, dissolved in a mixture of 240 ml of water and 7.5 g of acetic acid at 80° C., are added.

After stirring for 15 minutes, the pH is increased from 4 to 10 by means of dilute sodium hydroxide, and stirring is continued for further ½ hour. After being left overnight at 85° C., the pigment suspension is filtered and the filter cake is washed with water and dried at 65° C.

EXAMPLE H

A tetrazo solution of 3,3'-dichlorobenzidine bishydrochloride as produced according to step A of Example G is added during 2 hours at 20° C. and pH 4.1 to a suspension of 58 g of acetoacetanilide in a mixture of 1500 ml of water and 7.5 g of acetic acid. The resulting pigment suspension is heated to 75° C. and filtered. The filter cake is washed with water and dried at 65° C.

EXAMPLE J

A tetrazo solution is produced in step A of Example G is added during 1½ hours at a pH 4 and 20° C. to a suspension of 66.6 g of acetoacet-2,4-dimethylanilide in a mixture of 23 ml of water and 19.2 g of acetic acid. The resulting pigment suspension is heated to 80° C. and filtered. The filter cake is washed with water and dried at 65° C.

EXAMPLE K

A. 43.5 g of 4-methyl-2-nitroaniline are suspended in 200 ml of water and stirred for 16 hours, after which 200 g of ice and 85 ml of 30% hydrochloric acid are added. Maintaining the temperature at 0° C., 19.8 g of sodium nitrite are added and the mixture is stirred for 2 hours. The surplus of nitrous acid is then removed by means of sulfamic acid, and water is added to a volume of 700 ml, after which the diazo solution is filtered twice.

B. 46.5 g of acetoacetanilide are suspended in 700 ml of water, and a solution of 13.3 g of 66% acetic acid in 150 ml of water is added. To the resulting suspension, the diazo solution of step A is added at 20° C. and pH 4.8 during ½ hour. The resulting pigment suspension is heated to 50° C. and filtered. The filter cake is washed with water and dried at 65° C.

The following examples illustrate the production of azopigments according to the invention.

EXAMPLE 1

7.4 g of the compound produced according to Example A are dissolved in 220 ml of water, 1.3 ml of acetic acid are added and pH is adjusted to 4.8 with dilute sodium hydroxide. A tetrazo solution, produced from 4.6 g of 3,3'-dichlorobenzidine bis-hydrochloride as described in Example G, step A, is then added at pH 4.8 and 20° C. during 1½ hours. The resulting pigment suspension is heated to 80° C. and mixed with a pigment suspension produced according to Example H. The mixture is filtered and the filter cake is washed with water and dried at 65° C.

EXAMPLE 2

An azopigment is produced as described in Example H except that the 58 g of acetoacetanilide are replaced by a mixture of 52.2 g of acetoacetanilide and 14.6 g of the quaternary ammonium compound produced according to Example B.

EXAMPLE 3

The procedure of Example J is repeated, replacing the 66.6 g of acetoacet-2,4-dimethylanilide with a mixture of 59.9 g of acetoacet-2,4-dimethylanilide and 14.5 g of the quaternary ammonium compound produced according to Example B.

EXAMPLE 4

An azopigment is produced according to the method described in Example K with the amendment that instead of 46.5 g acetoacetanilide there are used 41.7 g in admixture with 11.7 g of the quaternary ammonium compound produced according to Example B.

EXAMPLE 5

The procedure in Example H was repeated, replacing the 58 g of acetoacetanilide by a mixture of 52.2 g of acetoacetanilide and 7.3 g of 3-ethoxycarbonyl-2-oxopropyl trimethylammonium chloride.

Comparative tests have been made with pigments produced as hereinbefore described, whereby 15 g of pigment and 135 g of a 40% hydrocarbon resin were ground with 250 g of glass beads for ½ hour in a Red Devil Mixer for the production of rotogravure printing inks.

The tests have shown that greater colour strength and substantially better stability on storing was obtained, using the pigment of Example 3 than by using the pigments of Examples G and J.

Similarly, the pigments produced according to Examples 2 and 5 showed greater colour strength and storing stability than did the pigments produced according to Examples G and H.

For the production of offset printing inks, 0.6 g of pigment and 1.4 g of varnish were ground for 4 times 30 seconds on a muller, after which 3 g of varnish were added.

Use of the pigment produced according to Example 3 resulted in greater transparency and greater redness than use of the pigment produced according to Example J.

For production of water-based paints, 15 g of pigment and 85 g of water-based acryl varnish were ground with 250 g of glass beads for 1 hour in a Red Devil Mixer.

As compared with a pigment produced according to Example H, the pigment produced according to Example 1 showed a substantially increased colour strength.

For the production of paints, 7 g of coloured pigment, 7 g of titanium dioxide and 30 g of 40% alkyd resin were ground with 120 g of glass beads on a Red Devil Mixer.

As compared with a pigment produced according to Example K, the pigment produced according to Example 4 showed a substantially increased colour strength.

We claim:

1. An azopigment which is the coupling product of 3,3'-dichlorobenzidine tetrazonium chloride and omega-trimethylammonium acetoacetanilide or a mixture of omega-trimethylammonium acetoacetonilide and acetoanilide.

2. An azopigment which is the coupling agent of 4-methyl-2-nitroaniline diazonium chloride and dimethylcocosammonium chloride in admixture with acetoanilide.

* * * * *